(12) United States Patent  
Hsue

(10) Patent No.: US 9,097,917 B2  
(45) Date of Patent: Aug. 4, 2015

(54) ELECTRONIC DISPLAY SCREEN MODULAR UNIT STRUCTURE

(71) Applicant: UBLeds Co., Ltd., New Taipei (TW)

(72) Inventor: ShouWen Hsue, New Taipei (TW)

(73) Assignee: UBLeds Co., Ltd., New Taipei (TW)

( * ) Notice: Subject to any disclaimer, the term of this patent is extended or adjusted under 35 U.S.C. 154(b) by 0 days.

(21) Appl. No.: 14/464,723

(22) Filed: Aug. 21, 2014

(65) Prior Publication Data

US 2014/0355266 A1    Dec. 4, 2014

(51) Int. Cl.
*G02F 1/01*    (2006.01)

(52) U.S. Cl.
CPC .................................... *G02F 1/0105* (2013.01)

(58) Field of Classification Search
USPC ............... 362/219, 225, 221, 217.11, 217.12, 362/217.13, 217.14, 217.15, 217.16, 362/217.17, 249.02, 249.04, 249.06, 362/249.08, 800
See application file for complete search history.

(56) References Cited

U.S. PATENT DOCUMENTS

| | | | |
|---|---|---|---|
| 6,488,385 B2 * | 12/2002 | Reithmeier | 362/600 |
| 8,083,373 B2 * | 12/2011 | Zimmerman et al. | 362/249.02 |
| 2010/0220046 A1 * | 9/2010 | Plotz et al. | 345/102 |
| 2012/0200521 A1 * | 8/2012 | Yoshimura | 345/173 |
| 2014/0218907 A1 * | 8/2014 | Gros | 362/221 |

* cited by examiner

*Primary Examiner* — Laura Tso

(57) ABSTRACT

An electronic display screen modular unit structure includes a modular unit which includes a pair of support boards and illumination strips. Through holes of the pair of support boards are provided with coupling members for connecting modular units, such that the modular units can be connected up and down as well as left and right. When each pair of support boards are separated from each other, the illumination strips can be unfolded flat to form a display screen at a predetermined width and height. Connecting plugs at two ends of a conductive wire are respectively connected with an output connecting terminal of the modular unit and an input connecting terminal of another adjacent modular unit, such that the modular units can be coupled and electrically connected with each other to form a display screen which is light and can be hanged on the wall or suspended.

4 Claims, 6 Drawing Sheets

ELECTRONIC DISPLAY SCREEN MODULAR UNIT STRUCTURE

BACKGROUND OF THE INVENTION

1. Field of the Invention

The present invention relates to an electronic display screen modular unit structure, and more particularly to an electronic display screen modular unit structure which is small in size and light in weight before installation and use and can be carried easily and conveniently.

2. Description of the Prior Art

For various occasions, a large-sized display screen is a common means to convey a message or advertisement. A conventional large-sized display screen, such as light-emitting diode (LED) flashy ads or LED electronic billboard or LED electronic display, uses LEDs or the arrangement of LED assembly to change the pattern, broadcast text or image. The large-sized LED display screen is large in size and heavy in weight, and is usually fixedly installed. For a temporary site or occasion, such as a temporary stage, a performance place, and so on, a movable display screen can be assembled by a plurality of modular units. For example, there is a conventional display screen modular unit structure with illumination assembly having drive circuit. However, each modular unit must be assembled on a frame, which causes a heavy burden for carry and transportation before assembly. Unless the manpower allocation of a professional audio stage or the budget is enough, otherwise most manufacturers won't use a large-sized display screen for a product exhibition because the equipment can not be carried conveniently. To improve the situation that the large-sized display screen is unfavorable for the use of a temporary occasion, it is necessary to consider not only the conditions to hang the display screen at different sites but also the problem of the size and weight of the modular unit.

Thus, the need for improvement still exists.

SUMMARY OF THE INVENTION

The primary object of the present invention is to provide an electronic display screen modular unit structure. A modular unit comprises a pair of support boards and a plurality of illumination strips. The support boards are hard printed circuit boards (PCB) in the shape of a strip, and are respectively formed with conductive circuits thereon, and have a plurality of through holes, respectively. The illumination strips are uprightly arranged side by side and spaced equally, and are attached to the support boards which are parallel and disposed transversely. Each of the illumination strips is a soft strip with a plurality of illumination members. Two ends of the soft strip are attached to flexible printed circuits (FPC) on the pair of support boards. The soft strip has conductive circuits thereon. The conductive circuits of the soft strip are electrically connected with the conductive circuits of the pair of support boards to form a directional telecommunication transmission circuit. The pair of support boards has an input connecting terminal and an output connecting terminal thereon as a signal input point and a signal output point of the telecommunication transmission circuit. The plurality of illumination members are light emitting diodes having drive circuit chips. The illumination members are disposed on the soft strip and spaced equally, and arranged in the form of at least one row. Through the telecommunication transmission circuit, the illumination members get a power source and signal data from the input connecting terminal and send the power source and the signal data to the output connecting terminal. The through holes of the pair of support boards are provided with coupling members for connecting a plurality of modular units, such that the modular units can be connected up and down as well as left and right. When each pair of support boards are separated from each other, the illumination strips can be unfolded flat to form a display screen at a predetermined width and height. Connecting plugs at two ends of a conductive wire, cooperating with connectors, are respectively connected with the output connecting terminal of the modular unit and the input connecting terminal of another adjacent modular unit, such that the modular units can be coupled and electrically connected with each other to form a display screen which is light and can be hanged on the wall or suspended. Before each modular unit is assembled to form a display screen or after it is disassembled, the flexible illumination strips can be rolled or folded on the pair of support boards to reduce its size. For the use of a temporary stage or a performance occasion, the display screen composed of the modular units can be reduced in size for transportation and can be moved and carried easily and conveniently.

Another object of the present invention is to provide an electronic display screen modular unit structure. Wherein, the conductive circuits of the pair of support boards and the conductive circuits of the soft strips of the illumination strips are electrically connected to form the telecommunication transmission circuit. The telecommunication transmission circuit is further provided with a power connection spare terminal on one of the pair of support boards. The number of the power connection spare terminal is selective for the power of the display screen composed of the modular units which may be in different numbers so as to adjust or maintain the normal power supply for the display screen.

A further object of the present invention is to provide an electronic display screen modular unit structure. Wherein, the pair of support boards are provided with a plurality of even illumination strips. The two ends of the soft strip of each of the illumination strips are attached on and electrically connected with the pair of support boards, respectively. The illumination strips are arranged side by side according to a telecommunication conduction route of the telecommunication transmission circuit. The telecommunication conduction route is from up to down and then to up. Two sides of either of the pair of support boards function as the signal input point and the signal output point of the telecommunication transmission circuit, and are provided with the input connecting terminal and the output connecting terminal. When the direction of the telecommunication transmission circuit is changed, the modular units can generate two telecommunication transmission modes to send a signal from right to left or from left to right. In view of the display screen is assembled by the plurality of modular units, the input connecting terminals and the output connecting terminals of the modular units can be selectively used so as to shorten the length of the conductive wire or the distance of connection.

A further yet object of the present invention is to provide an electronic display screen modular unit structure. Wherein, the pair of support boards are provided with a plurality of odd illumination strips. The two ends of the soft strip of each of the illumination strips are attached on and electrically connected with the pair of support boards, respectively. The illumination strips are arranged side by side according to a telecommunication conduction route of the telecommunication transmission circuit. The telecommunication conduction route is from up to down and returns to up and then to down, or is from down to up and returns to down and then to up. Respective sides of the support boards function as the signal input point and the signal output point of the telecommunication transmission circuit, and are provided with the input connecting terminal and the output connecting terminal, respectively. The input connecting terminal and the output connecting terminal can be changed on the pair of the support boards and the direction of the telecommunication transmission circuit is changed so as to get the change of the location of the input connecting terminal and the output connecting terminal. The modular units can generate different telecommunication transmission modes to send a signal from upper left to low right, from low right to upper left, from upper left to low right, or from low right to upper left. In view of the display screen is assembled by the plurality of modular units, the input connecting terminals and the output connecting terminals of the modular units can be selectively used so as to shorten the length of the conductive wire or the distance of connection.

The above and other objects, features and advantages of the invention will become apparent from the following detailed description taken with the accompanying drawings.

DETAILED DESCRIPTION OF THE PREFERRED EMBODIMENTS

Figure 1:
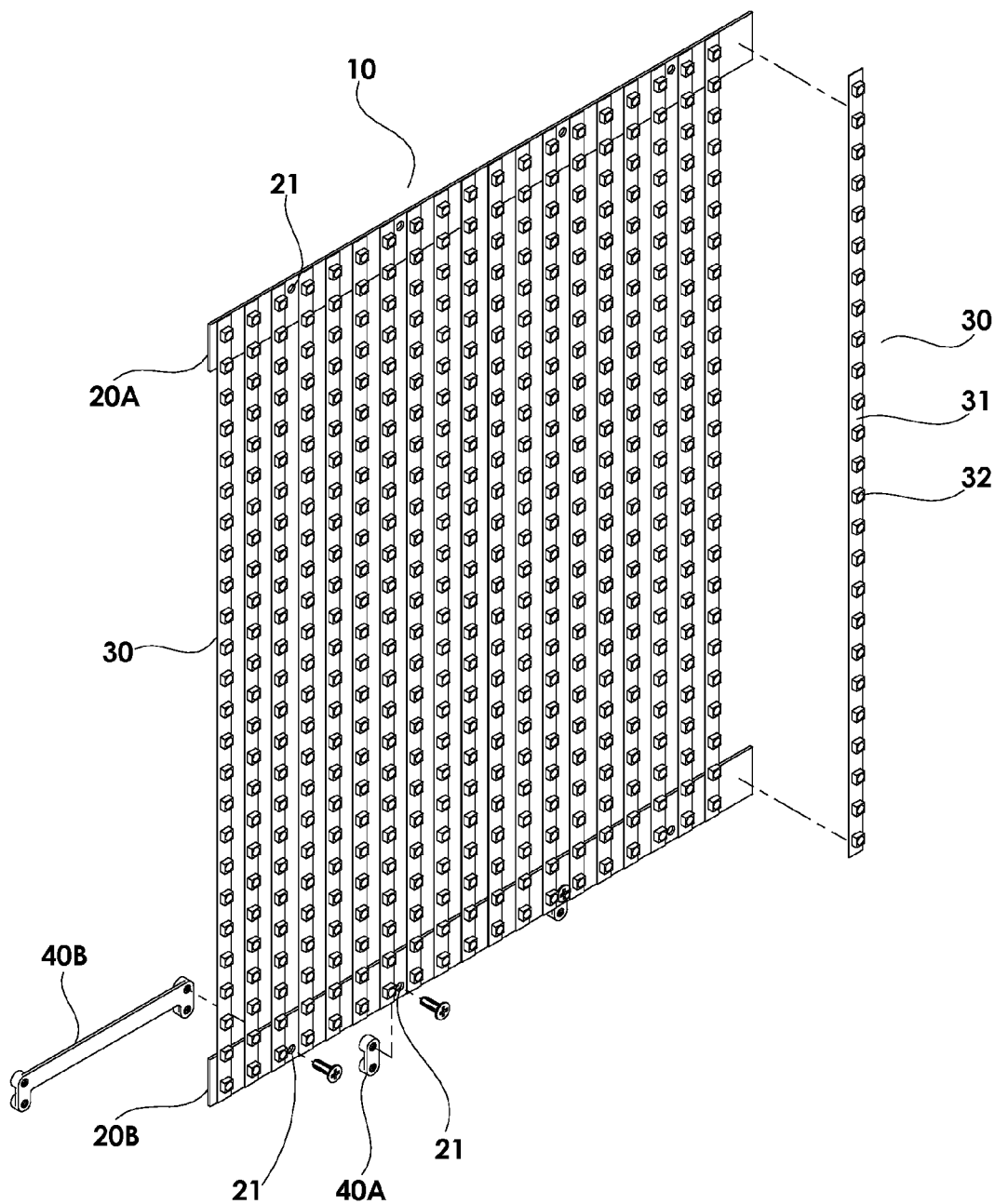
FIG. 1 is a front perspective exploded view of the present invention.

Referring to FIGS. 1 to 6, an electronic display screen modular unit structure of the present invention is shown. A modular unit 10 comprises a pair of support boards 20A, 20B and a plurality of illumination strips 30. The support boards 20A, 20B are hard printed circuit boards (PCB) in the shape of a strip, and are respectively formed with conductive circuits thereon (not shown), and have a plurality of through holes 21, respectively. The illumination strips 30 are uprightly arranged side by side and spaced equally, and are attached on the support boards 20A, 20B which are parallel and disposed transversely. Each of the illumination strips 30 is a soft strip 31 with a plurality of illumination members 32. Two ends of the soft strip 31 are attached to flexible printed circuits (FPC) on the pair of support boards 20A, 20B. The soft strip 31 has conductive circuits thereon (not shown). The conductive circuits of the soft strip 31 are electrically connected with the conductive circuits of the pair of support boards 20A, 20B to form a directional telecommunication transmission circuit (not shown).

The pair of support boards 20A, 20B has an input connecting terminal 22 and an output connecting terminal 23 thereon as a signal input point and a signal output point of the telecommunication transmission circuit. The plurality of illumination members 32 are monochromatic or colored light emitting diodes having drive circuit chips. The illumination members 32 are disposed on the soft strip 31 and spaced equally, and arranged in the form of at least one row. Through the telecommunication transmission circuit, the illumination members 32 get a power source and signal data from the input connecting terminal 22 and send the power source and the signal data to the output connecting terminal 23.

The through holes 21 of the pair of support boards 20A, 20B are provided with coupling members 40A, 40B for connecting a plurality of modular units 10, such that the modular units 10 can be connected up and down as well as left and right. When each pair of support boards 20A, 20B are separated from each other, the illumination strips 30 can be unfolded flat to form a display screen at a predetermined width and height. Connecting plugs 51 at two ends of a conductive wire 50, cooperating with connectors 52, are respectively connected with the output connecting terminal 23 of the modular unit 10 and the input connecting terminal 22 of another adjacent modular unit 10, such that the modular units 10 can be coupled and electrically connected with each other to form a display screen which is light and can be hanged on the wall or suspended. Before each modular unit 10 is assembled to form a display screen or after it is disassembled, the flexible illumination strips 30 can be rolled or folded on the pair of support boards 20A, 20B to reduce its size (not shown). For the use of a temporary stage or a performance occasion, the display screen composed of the modular units 10 can be reduced in size for transportation and can be moved and carried easily and conveniently.

Figure 2:
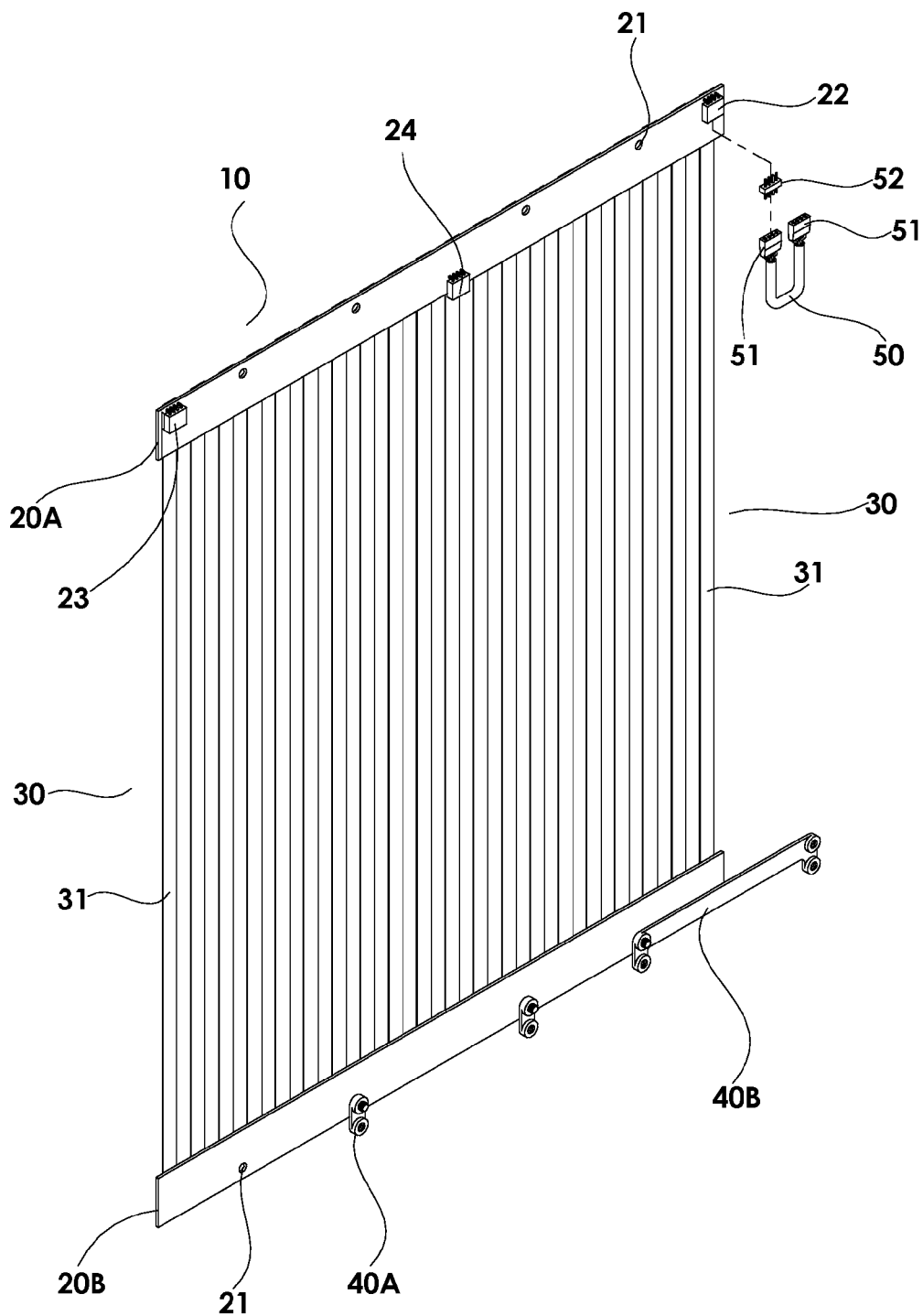
FIG. 2 is a rear perspective view of the present invention.
Figure 3:
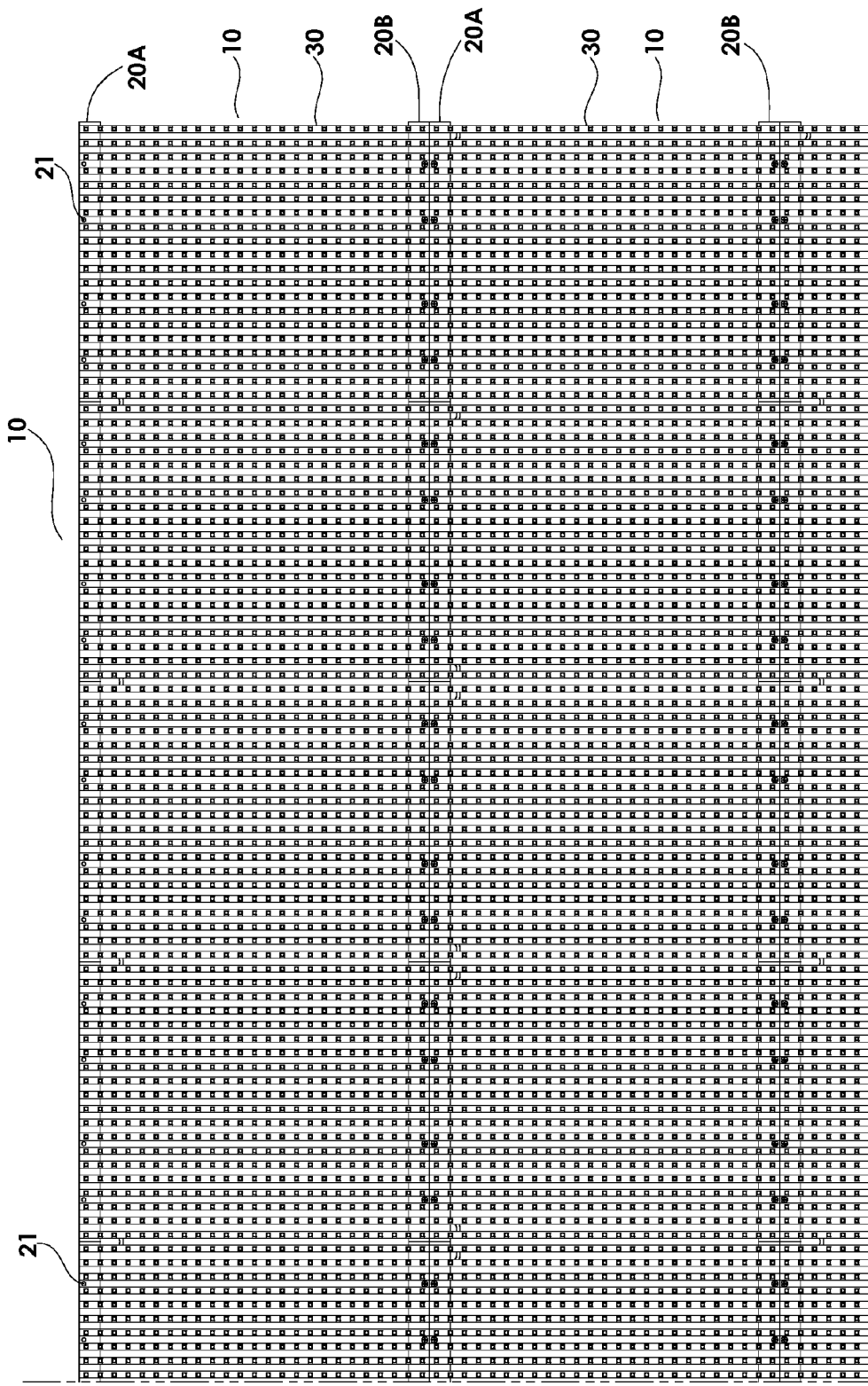
FIG. 3 is a front view of a display screen composed of the present invention.
Figure 4:
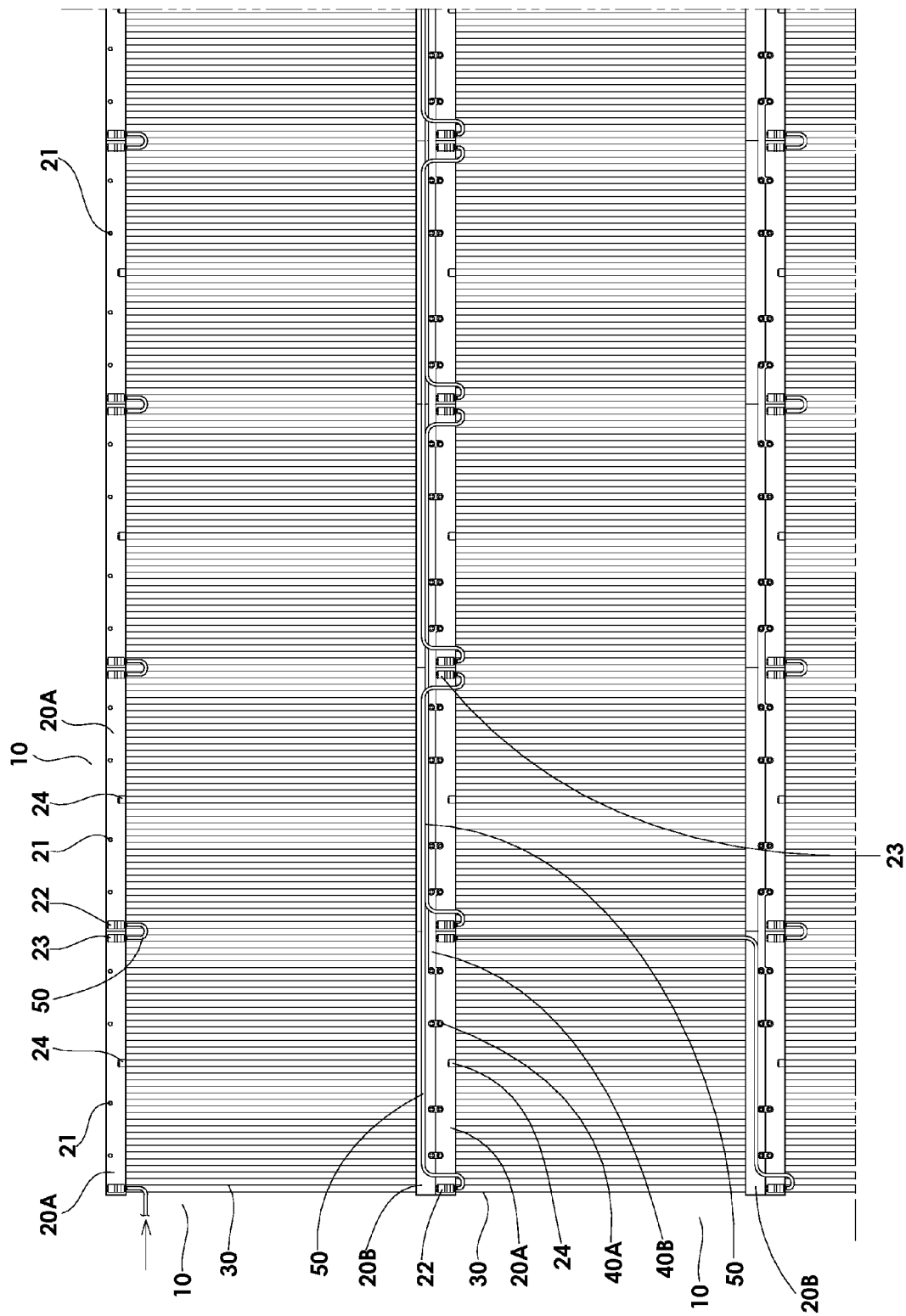
FIG. 4 is a rear view of the display screen composed of the present invention.

According to the aforesaid embodiment, as shown in FIGS. 2 and 4, the conductive circuits of the pair of support boards 20A, 20B and the conductive circuits of the soft strips 31 of the illumination strips 30 are electrically connected to form the telecommunication transmission circuit. The telecommunication transmission circuit is further provided with a power connection spare terminal 24 on one of the pair of support boards 20A, 20B. The number of the power connection spare terminal 24 is selective for the power of the display screen composed of the modular units 10 which may be in different numbers so as to adjust or maintain the normal power supply for the display screen.

According to the aforesaid embodiment, as shown in FIG. 2, the pair of support boards 20A, 20B is provided with a plurality of even illumination strips 30. The two ends of the soft strip 31 of each of the illumination strips 30 are attached on and electrically connected with the pair of support boards 20A, 20B, respectively. The illumination strips 30 are arranged side by side according to a telecommunication conduction route of the telecommunication transmission circuit. The telecommunication conduction route is from up to down and then to up. Two sides of either of the pair of support boards 20A, 20B function as the signal input point and the signal output point of the telecommunication transmission circuit, and are provided with the input connecting terminal 22 and the output connecting terminal 23. In this embodiment, the input connecting terminal 22 and the output connecting terminal 23 are disposed on the support board 20A.

Figure 5:
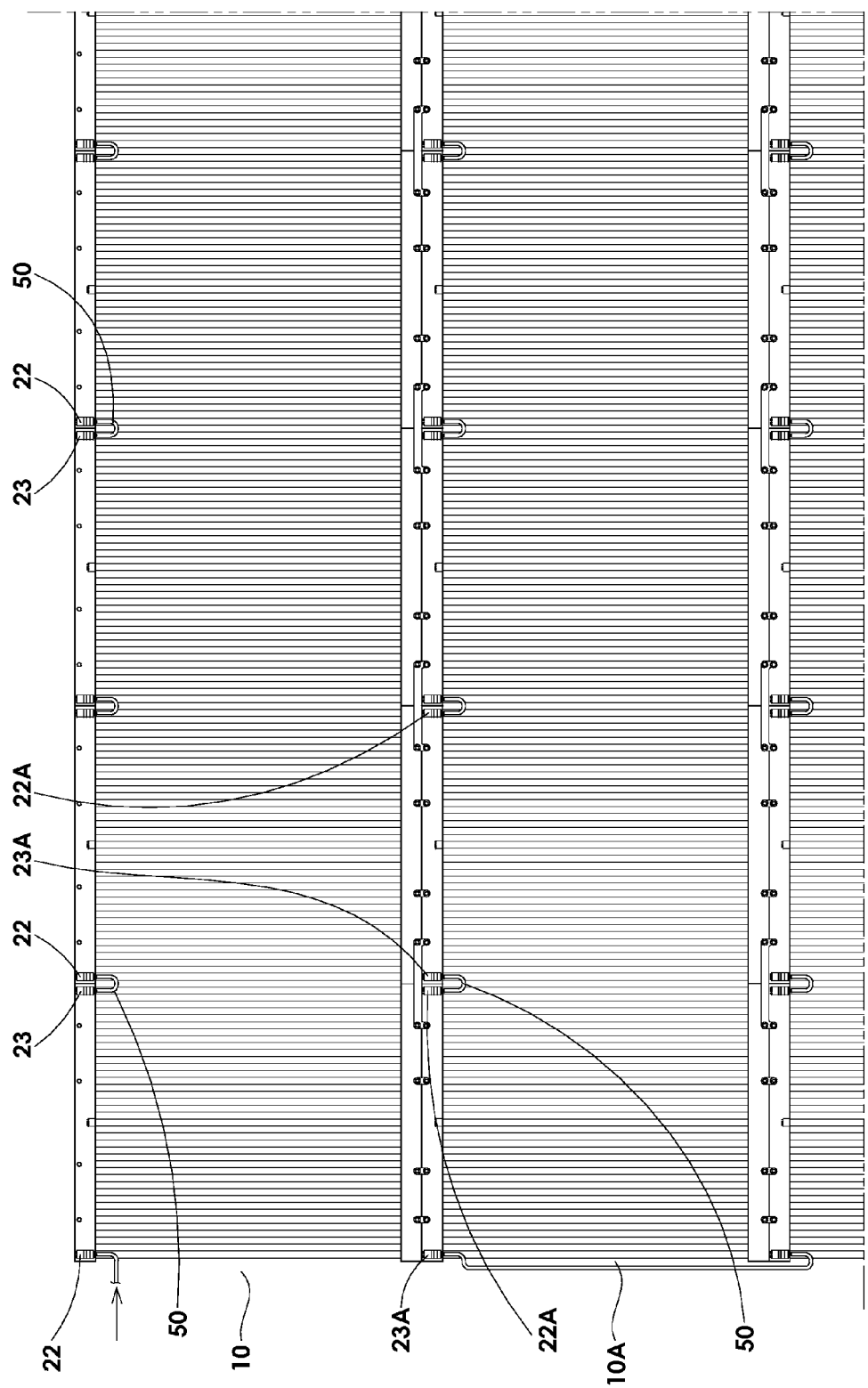
FIG. 5 is a schematic view showing a plurality of even illumination strips of the present invention to shorten the conductive wire.

When the direction of the telecommunication transmission circuit is changed, as shown in FIG. 5, the modular units 10, 10A can generate two telecommunication transmission modes to send a signal from right to left or from left to right. In view of the display screen is assembled by the plurality of modular units 10, 10A, the input connecting terminals 22, 22A and the output connecting terminals 23, 23A of the modular units 10, 10A can be selectively used so as to shorten the length of the conductive wire 50 or the distance of connection.

Figure 6:
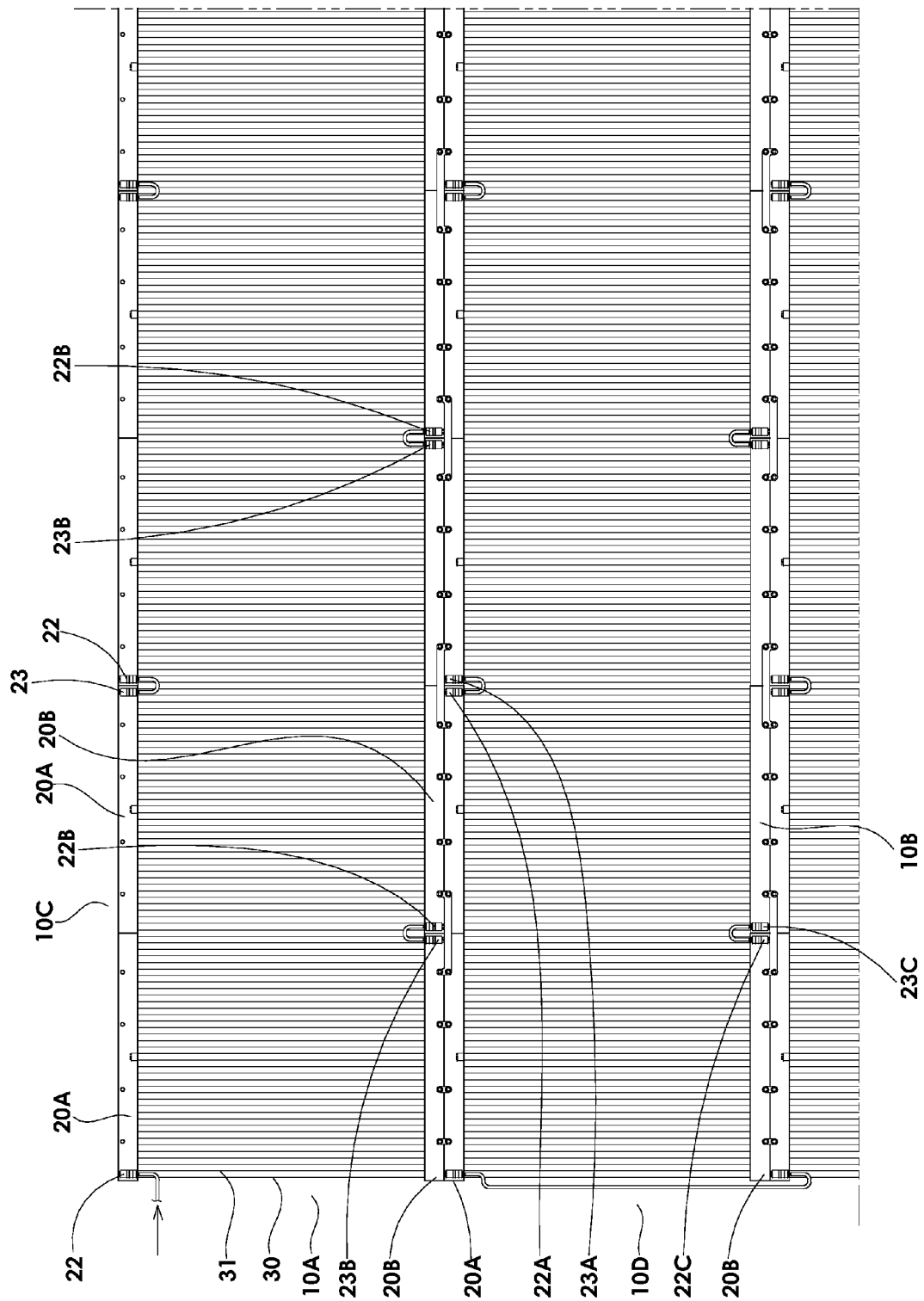
FIG. 6 is a schematic view showing a plurality of odd illumination strips of the present invention to shorten the conductive wire.

According to the aforesaid embodiment, as shown in FIG. 6, the pair of support boards 20A, 20B is provided with a plurality of odd illumination strips 30. The two ends of the soft strip 31 of each of the illumination strips 30 are attached on and electrically connected with the pair of support boards 20A, 20B, respectively. The illumination strips 30 are arranged side by side according to a telecommunication conduction route of the telecommunication transmission circuit. The telecommunication conduction route is from up to down and returns to up and then to down, or is from down to up and returns to down and then to up. Respective sides of the support boards 20A, 20B function as the signal input point and the signal output point of the telecommunication transmission circuit, and are provided with the input connecting terminal 22 and the output connecting terminal 23B, respectively. In this embodiment, the input connecting terminal 22 and the output connecting terminal 23B can be changed on the pair of the support boards 20A, 20B and the direction of the telecommunication transmission circuit is changed so as to get the change of the location of the input connecting terminal 22, 22A, 22B, 22C and the output connecting terminal 23, 23A, 23B, 23C. The modular units 10A, 10B, 10C, 10D can generate different telecommunication transmission modes to send a signal from upper left to low right, from low right to upper left, from upper left to low right, or from low right to upper left. In view of the display screen is assembled by the plurality of modular units 10A, 10B, 10C, 10D, the input connecting terminals 22, 22A, 22B, 22C and the output connecting terminals 23, 23A, 23B, 23C of the modular units 10A, 10B, 10C, 10D can be selectively used so as to shorten the length of the conductive wire or the distance of connection.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An electronic display screen modular unit structure, comprising a modular unit, the modular unit comprising a pair of support boards and a plurality of illumination strips; the pair of support boards being hard printed circuit boards (PCB) in the shape of a strip, being respectively formed with conductive circuits thereon, and having a plurality of through holes, respectively; the plurality of illumination strips being uprightly arranged side by side and spaced equally, and being attached on the support boards which are parallel and disposed transversely; each of the illumination strips being a soft strip with a plurality of illumination members; two ends of the soft strip being attached to flexible printed circuits (FPC) on the pair of support boards, the soft strip having conductive circuits thereon, the conductive circuits of the soft strip being electrically connected with the conductive circuits of the pair of support boards to form a directional telecommunication transmission circuit, the pair of support boards having an input connecting terminal and an output connecting terminal thereon as a signal input point and a signal output point of the telecommunication transmission circuit; the plurality of illumination members being light emitting diodes having drive circuit chips, the illumination members being disposed on the soft strip and spaced equally, and arranged in the form of at least one row, through the telecommunication transmission circuit, the illumination members getting a power source and signal data from the input connecting terminal and sending the power source and the signal data to the output connecting terminal.

2. The electronic display screen modular unit structure as claimed in claim 1, wherein the conductive circuits of the pair of support boards and the conductive circuits of the soft strips of the illumination strips are electrically connected to form the telecommunication transmission circuit, the telecommunication transmission circuit being further provided with a power connection spare terminal on one of the pair of support boards.

3. The electronic display screen modular unit structure as claimed in claim 1, wherein the pair of support boards are provided with a plurality of even illumination strips, the two ends of the soft strip of each of the illumination strips being attached on and electrically connected with the pair of support boards respectively, the illumination strips being arranged side by side according to a telecommunication conduction route of the telecommunication transmission circuit, the telecommunication conduction route being from up to down and then to up, two sides of either of the pair of support boards functioning as the signal input point and the signal output point of the telecommunication transmission circuit and being provided with the input connecting terminal and the output connecting terminal.

4. The electronic display screen modular unit structure as claimed in claim 1, wherein the pair of support boards are provided with a plurality of odd illumination strips, the two ends of the soft strip of each of the illumination strips being attached on and electrically connected with the pair of support boards respectively, the illumination strips being arranged side by side according to a telecommunication conduction route of the telecommunication transmission circuit, the telecommunication conduction route being from up to down and returning to up and then to down, or being from down to up and returning to down and then to up, respective sides of the support boards functioning as the signal input point and the signal output point of the telecommunication transmission circuit and being provided with the input connecting terminal and the output connecting terminal, respectively.

* * * * *